United States Patent
Khoshnevisan et al.

(10) Patent No.: US 11,757,545 B2
(45) Date of Patent: Sep. 12, 2023

(54) INTER-CELL LL-RSRP REPORTING

(71) Applicant: QUALCOMM Incorporated, San Diego, CA (US)

(72) Inventors: Mostafa Khoshnevisan, San Diego, CA (US); Yan Zhou, San Diego, CA (US); Tao Luo, San Diego, CA (US); Xiaoxia Zhang, San Diego, CA (US); Peter Gaal, San Diego, CA (US); Arumugam Chendamarai Kannan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 16/949,019

(22) Filed: Oct. 9, 2020

(65) Prior Publication Data

US 2021/0111817 A1  Apr. 15, 2021

Related U.S. Application Data

(60) Provisional application No. 62/914,690, filed on Oct. 14, 2019.

(51) Int. Cl.
*H04B 17/318* (2015.01)
*H04W 24/10* (2009.01)

(52) U.S. Cl.
CPC .......... *H04B 17/318* (2015.01); *H04W 24/10* (2013.01)

(58) Field of Classification Search
CPC .............................. H04B 17/318; H04W 24/10
See application file for complete search history.

(56) References Cited

U.S. PATENT DOCUMENTS

2019/0045559 A1* 2/2019 Huang ................ H04B 17/318
2019/0058517 A1  2/2019 Kang et al.
(Continued)

FOREIGN PATENT DOCUMENTS

CN  110249549 A  9/2019
WO  2018203679 A1  11/2018
(Continued)

OTHER PUBLICATIONS

"3rd Generation Partnership Project, Technical Specification Group Radio Access Network, NR, Radio Resource Control (RRC) Protocol Specification (Release 15)", 3GPP Draft, 38.331, v15.7.0, 3rd Generation Partnership Project (3GPP), Mobile Competence Centre, 650, Route Des Lucioles, F-06921 Sophia-Antipolis Cedex, France, Sep. 27, 2019 (Sep. 27, 2019), XP051799980, 526 Pages, Retrieved from the Internet: URL: https://ftp.3gpp.org/3guInternal/3GPP_ultimate_versions_to_be_transposed/sentToDpc/38331-170.zip.[retrieved on Sep. 27, 2019].

(Continued)

*Primary Examiner* — Deepa Belur
(74) *Attorney, Agent, or Firm* — QUALCOMM Incorporated

(57) ABSTRACT

Various aspects of the present disclosure generally relate to wireless communication. In some aspects, a user equipment (UE) may generate a layer one reference signal received power (L1-RSRP) measurement report to include an indication of L1-RSRP measurements associated with one or more synchronization signal bocks (SSBs) included in an SSB set, wherein the SSB set is identified, from a plurality of SSB sets, in the L1-RSRP measurement report by an SSB set indicator, and wherein the one or more SSBs are identified in the L1-RSRP measurement report by respective SSB indexes that index into the SSB set. The UE may (Continued)

transmit the L1-RSRP measurement report. Numerous other aspects are provided.

46 Claims, 15 Drawing Sheets

(56) References Cited

U.S. PATENT DOCUMENTS

| | | |
|---|---|---|
| 2019/0103928 A1 | 4/2019 | Nagaraja et al. |
| 2019/0190582 A1 | 6/2019 | Guo et al. |
| 2019/0215136 A1 | 7/2019 | Zhou et al. |
| 2019/0222286 A1* | 7/2019 | Miao .............. H04L 5/0048 |
| 2020/0015141 A1* | 1/2020 | Shi ................ H04W 72/085 |
| 2020/0077285 A1* | 3/2020 | Yu ................. H04W 72/12 |
| 2020/0120523 A1* | 4/2020 | Ramachandra ....... H04W 24/10 |
| 2020/0196161 A1 | 6/2020 | Ahn et al. |
| 2020/0236574 A1* | 7/2020 | Ohuchi ............. H04L 5/0057 |
| 2021/0058998 A1* | 2/2021 | Yuan .............. H04W 24/08 |
| 2021/0111818 A1* | 4/2021 | Zhu ................ H04W 24/10 |
| 2021/0266898 A1* | 8/2021 | Cha .............. H04W 72/0453 |
| 2022/0038194 A1* | 2/2022 | Matsumura ......... H04L 27/261 |

FOREIGN PATENT DOCUMENTS

| | | | |
|---|---|---|---|
| WO | 2018204863 A1 | 11/2018 | |
| WO | 2019139140 A1 | 7/2019 | |
| WO | WO-2020015379 A1 * | 1/2020 | ............ H04B 17/15 |
| WO | WO-2020059146 A1 * | 3/2020 | |

OTHER PUBLICATIONS

Ericsson: "Details on Lower-Layer Mobility Enhancements", 3GPP Draft, 3GPP TSG-RAN WG1 Meeting #98, Tdoc R1-1909227 Details on Lower-Layer Mobility Enhancements, 3rd Generation Partnership Project (3GPP), Mobile Competence Centre, 650, Route Des Lucioles, F-06921 Sophia-Antipolis Cedex, FR, vol. RAN WG1, No. Prague, Czech Republic, Aug. 26, 2019-Aug. 30, 2019 Aug. 16, 2019 (Aug. 16, 2019), XP051765832, pp. 1-8, Retrieved from the Internet: URL:http://www.3gpp.org/ftp/tsg_ran/WG1_RL1/TSGR1_98/Docs/R1-1909227.zip [retrieved on Aug. 16, 2019].
International Search Report and Written Opinion—PCT/US2020/070660—ISA/EPO—dated Apr. 30, 2021.

* cited by examiner

```
CSI-SSB-ResourceSet ::=      SEQUENCE {
    CSI-SSB-ResourceSetId        CSI-SSB-ResourceSetId,
    SSB-SET                      Integer(0,1)
    CSI-SSB-ResourceList         SEQUENCE (SIZE(1..maxNrofCSI-SSB-ResourcePerSet)) OF SSB-Index,
    ...
}
```

FIG. 6B

```
CSI-SSB-ResourceSet ::=      SEQUENCE {
    CSI-SSB-ResourceSetId        CSI-SSB-ResourceSetId,
    CSI-SSB-ResourceList         SEQUENCE (SIZE(1..maxNrofCSI-SSB-ResourcePerSet)) OF SSB-IndexandSet,
    ...
}

SSB-IndexandSet::=           INTEGER (0..2*maxNrofSSBs-1)
```

FIG. 7B

```
CSI-SSB-ResourceSet ::=      SEQUENCE {
    csi-SSB-ResourceSetId        CSI-SSB-ResourceSetId,
    csi-SSB-ResourceList         SEQUENCE (SIZE(1..maxNrofCSI-SSB-ResourcePerSet)) OF SSB-IndexandSet,
    ...
}

SSB-IndexandSet::=           SEQUENCE {
    SSB-Index ::=                INTEGER (0..maxNrofSSBs-1)
    SSB-Set ::=                  INTEGER (0..1)
}
```

```
CSI-SSB-ResourceSet ::=      SEQUENCE {
    CSI-SSB-ResourceSetId        CSI-SSB-ResourceSetId,
    CSI-SSB-ResourceList0        SEQUENCE (SIZE(1..maxNrofCSI-SSB-ResourcePerList)) OF SSB-Index
    CSI-SSB-ResourceList1        SEQUENCE (SIZE(1..maxNrofCSI-SSB-ResourcePerList)) OF SSB-Index
    ...
}
```

FIG. 7D

```
CSI-SSB-ResourceSet ::=      SEQUENCE {
    csi-SSB-ResourceSetId        CSI-SSB-ResourceSetId,
    csi-SSB-ResourceListSet      SEQUENCE (SIZE(1..maxNrofLists-within-ListSet)) OF CSI-SSB-ResourceList
    ...
}

CSI-SSB-ResourceList ::=     SEQUENCE {
    SSB-Set::=                   INTEGER (0..1)
    resourceList::=              SEQUENCE (SIZE(1..maxNrofCSI-SSB-ResourcePerList)) OF SSB-Index
    ...
}
```

INTER-CELL L1-RSRP REPORTING

CROSS-REFERENCE TO RELATED APPLICATION

This Patent Application claims priority to U.S. Provisional Patent Application No. 62/914,690, filed on Oct. 14, 2019, entitled "INTER-CELL L1-RSRP REPORTING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for inter-cell layer one reference signal received power reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include generating a layer one reference signal received power (L1-RSRP) measurement report to include an indication of L1-RSRP measurements associated with one or more synchronization signal bocks (SSBs) included in an SSB set, wherein the SSB set is identified, from a plurality of SSB sets, in the L1-RSRP measurement report by an SSB set indicator, and wherein the one or more SSBs are identified in the L1-RSRP measurement report by respective SSB indexes that index into the SSB set; and transmitting the L1-RSRP measurement report.

In some aspects, a method of wireless communication, performed by a UE, may include generating an L1-RSRP measurement report to include an indication of L1-RSRP measurements associated with one or more first SSBs included in a first SSB set that is associated with a first physical cell identifier (PCI), and L1-RSRP measurements associated with one or more second SSBs included in a second SSB set that is associated with a second PCI; and transmitting the L1-RSRP measurement report.

In some aspects, a UE for wireless communication may include memory and one or more processors operatively coupled to the memory. The memory and the one or more processors may be configured to generate an L1-RSRP measurement report to include an indication of L1-RSRP measurements associated with one or more SSBs included in an SSB set, wherein the SSB set is identified, from a plurality of SSB sets, in the L1-RSRP measurement report by an SSB set indicator, and wherein the one or more SSBs are identified in the L1-RSRP measurement report by respective SSB indexes that index into the SSB set; and transmit the L1-RSRP measurement report.

In some aspects, a UE for wireless communication may include memory and one or more processors operatively coupled to the memory. The memory and the one or more processors may be configured to generate an L1-RSRP measurement report to include an indication of L1-RSRP measurements associated with one or more first SSBs included in a first SSB set that is associated with a first PCI, and L1-RSRP measurements associated with one or more second SSBs included in a second SSB set that is associated with a second PCI; and transmit the L1-RSRP measurement report.

In some aspects, a non-transitory computer-readable medium may store one or more instructions for wireless communication. The one or more instructions, when executed by one or more processors of a UE, may cause the one or more processors to: generate a L1-RSRP measurement report to include an indication of L1-RSRP measurements associated with one or more SSBs included in an SSB set, wherein the SSB set is identified, from a plurality of SSB sets, in the L1-RSRP measurement report by an SSB set indicator, and wherein the one or more SSBs are identified in the L1-RSRP measurement report by respective SSB indexes that index into the SSB set; and transmit the L1-RSRP measurement report.

In some aspects, a non-transitory computer-readable medium may store one or more instructions for wireless communication. The one or more instructions, when executed by one or more processors of a UE, may cause the one or more processors to: generate an L1-RSRP measurement report to include an indication of: L1-RSRP measurements associated with one or more first SSBs included in a first SSB set that is associated with a first PCI, and L1-RSRP measurements associated with one or more second SSBs included in a second SSB set that is associated with a second PCI; and transmit the L1-RSRP measurement report.

In some aspects, an apparatus for wireless communication may include means for generating an L1-RSRP measurement report to include an indication of L1-RSRP measurements associated with one or more SSBs included in an SSB set, wherein the SSB set is identified, from a plurality of SSB sets, in the L1-RSRP measurement report by an SSB set indicator, and wherein the one or more SSBs are identified in the L1-RSRP measurement report by respective SSB indexes that index into the SSB set; and means for transmitting the L1-RSRP measurement report.

In some aspects, an apparatus for wireless communication may include means for generating an L1-RSRP measurement report to include an indication of: L1-RSRP measurements associated with one or more first SSBs included in a first SSB set that is associated with a first PCI, and L1-RSRP measurements associated with one or more second SSBs included in a second SSB set that is associated with a second PCI; and means for transmitting the L1-RSRP measurement report.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A, 6B, and 7A-7E are diagrams illustrating examples of inter-cell layer one reference signal received power reporting, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
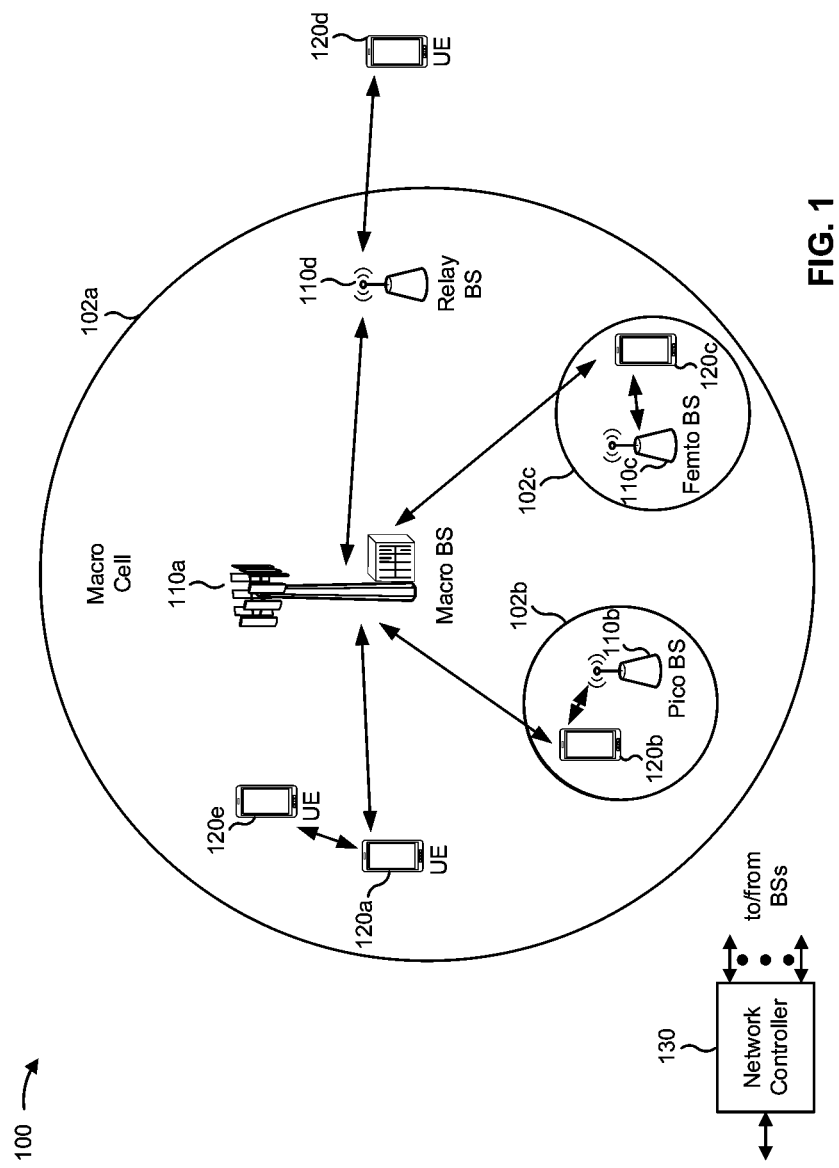
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
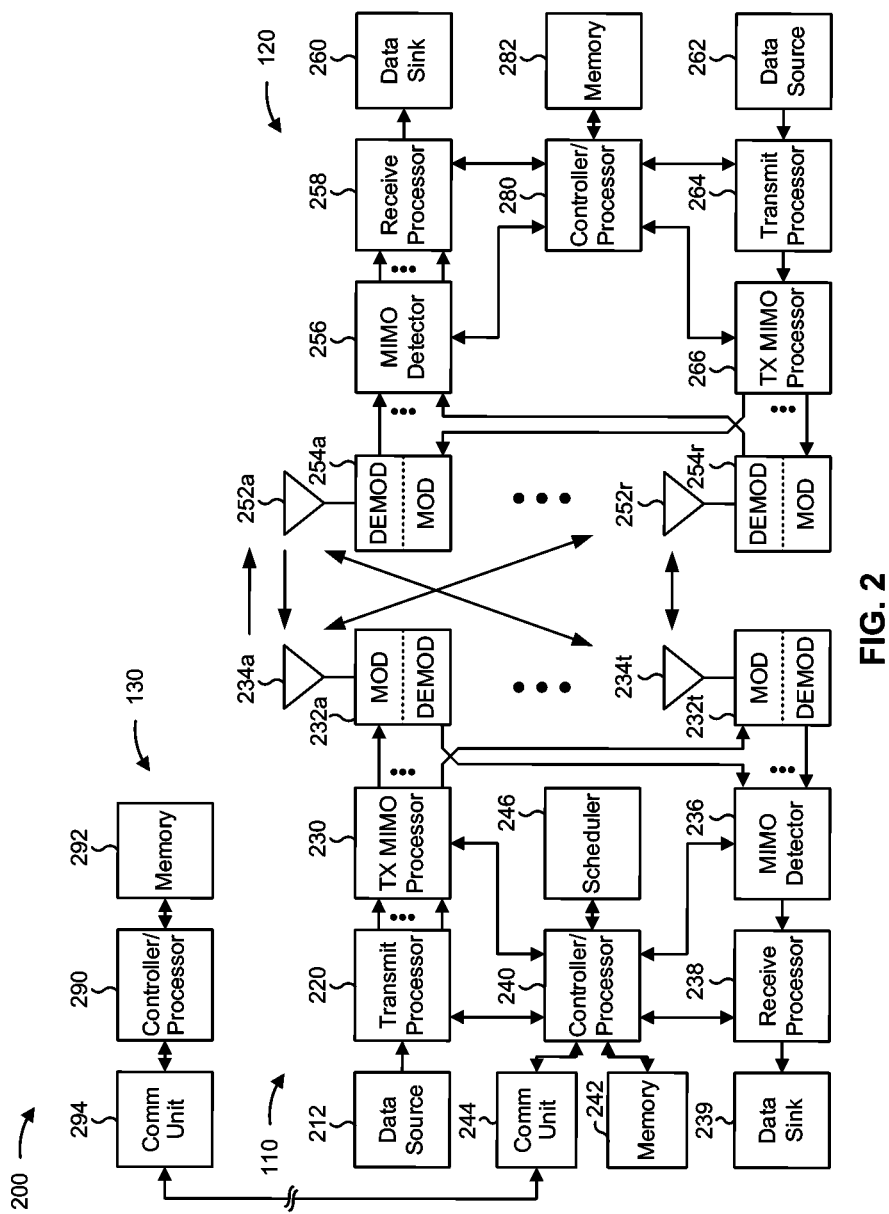
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with inter-cell layer one reference signal received power (L1-RSRP) reporting, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for generating an L1-RSRP measurement report to include an indication of L1-RSRP measurements associated with one or more synchronization signal bocks (SSBs) included in an SSB set, wherein the SSB set is identified, from a plurality of SSB sets, in the L1-RSRP measurement report by an SSB set indicator, and wherein the one or more SSBs are identified in the L1-RSRP measurement report by respective SSB indexes that index into the SSB set, means for transmitting the L1-RSRP measurement report, and/or the like. In some aspects, UE 120 may include means for generating an L1-RSRP measurement report to include an indication of L1-RSRP measurements associated with one or more first SSBs included in a first SSB set that is associated with a first physical cell identifier (PCI) and L1-RSRP measurements associated with one or more second SSBs included in a second SSB set that is associated with a second PCI, means for transmitting the L1-RSRP measurement report, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
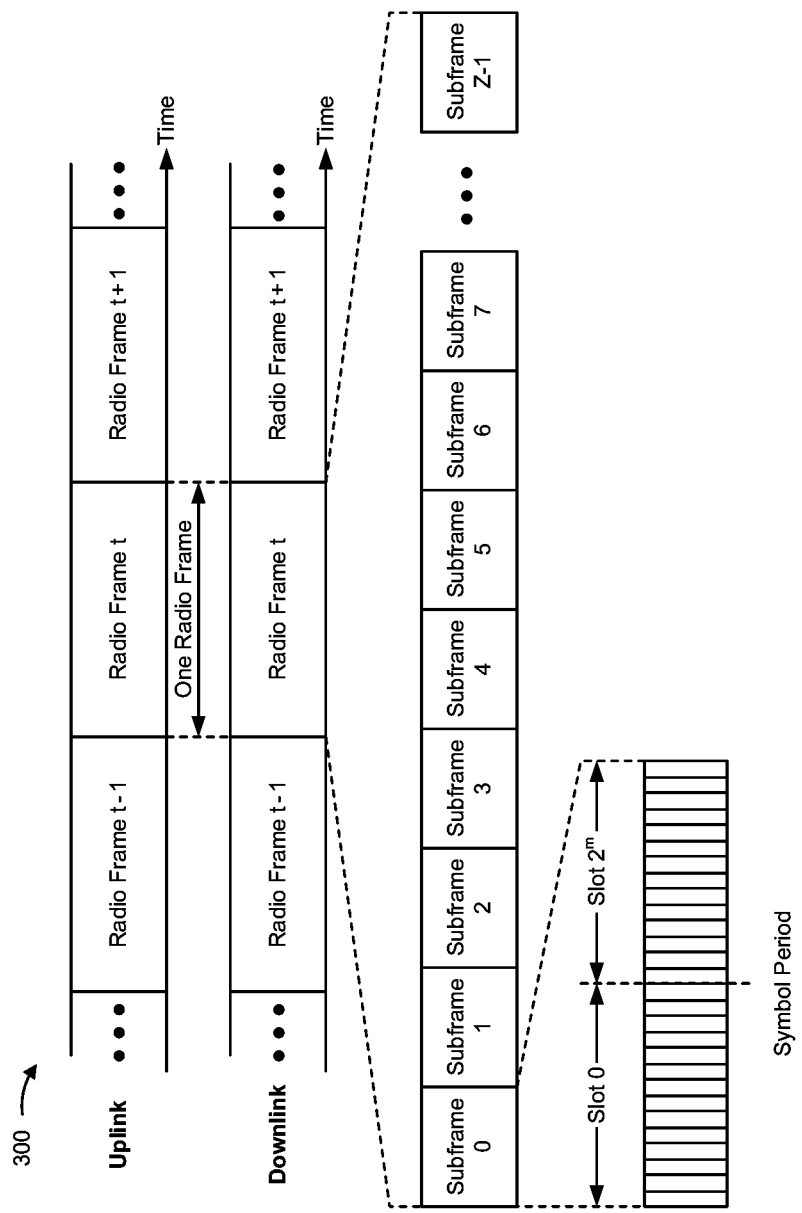
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
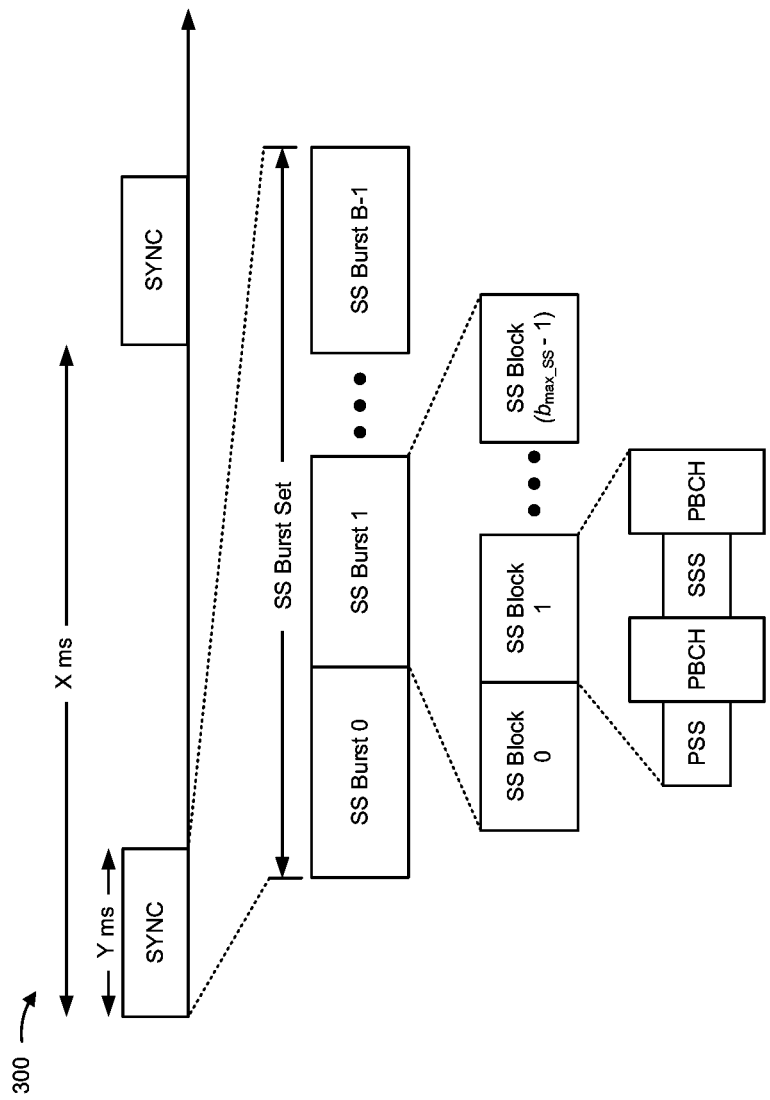
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what was described with regard to FIGS. 3A and 3B.

Figure 4:
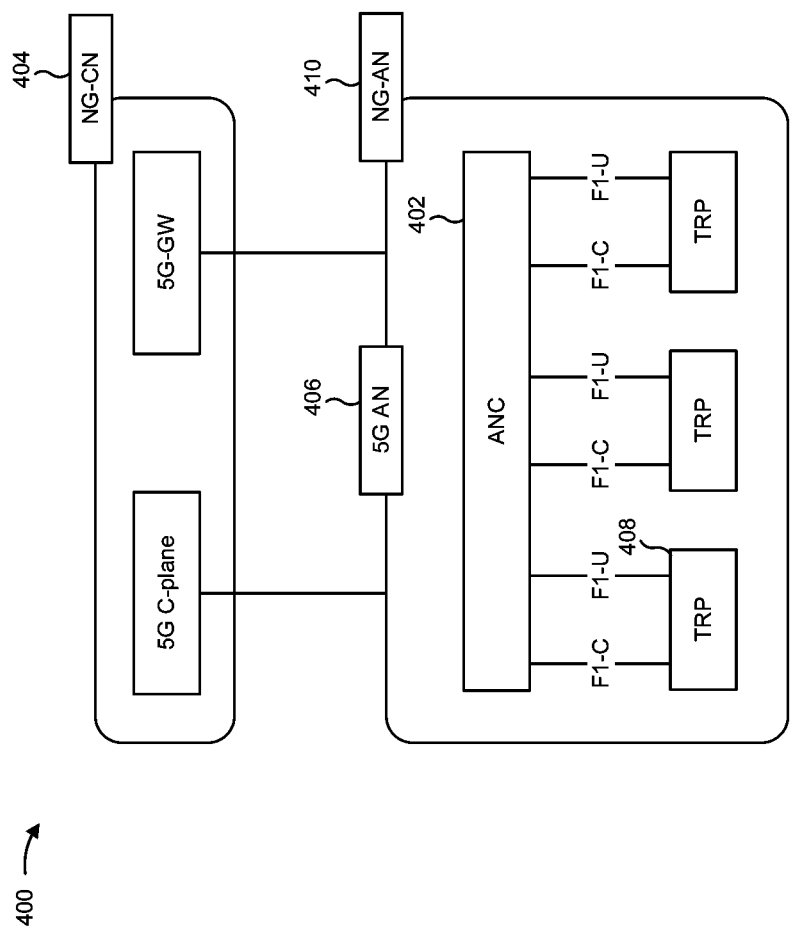
FIG. 4 illustrates an example logical architecture of a distributed radio access network (RAN), in accordance with various aspects of the present disclosure.

FIG. 4 illustrates an example logical architecture of a distributed RAN 400, according to aspects of the present disclosure. A 5G access node 406 may include an access node controller (ANC) 402. The ANC may be a central unit (CU) of the distributed RAN 400. The backhaul interface to the next generation core network (NG-CN) 404 may terminate at the ANC. The backhaul interface to neighboring next generation access nodes (NG-ANs) may terminate at the ANC. The ANC may include one or more TRPs 408 (which may also be referred to as BSs, NR BSs, Node Bs, 5G NBs, APs, gNB, or some other term). As described above, "TRP" may be used interchangeably with "cell."

The TRPs 408 may be a distributed unit (DU). The TRPs may be connected to one ANC (ANC 402) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 400 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 410 may support dual connectivity with NR. The NG-AN may share a common fronthaul for LTE and NR.

The architecture may enable cooperation between and among TRPs 408. For example, cooperation may be preset within a TRP and/or across TRPs via the ANC 402. According to aspects, no inter-TRP interface may be needed/present.

According to aspects, a dynamic configuration of split logical functions may be present within the architecture of RAN 400. The packet data convergence protocol (PDCP), radio link control (RLC), or medium access control (MAC) protocol may be adaptably placed at the ANC or TRP.

According to various aspects, a BS may include a central unit (CU) (e.g., ANC 402) and/or one or more distributed units (e.g., one or more TRPs 408).

As indicated above, FIG. 4 is provided as an example. Other examples may differ from what is described with regard to FIG. 4.

Figure 5:
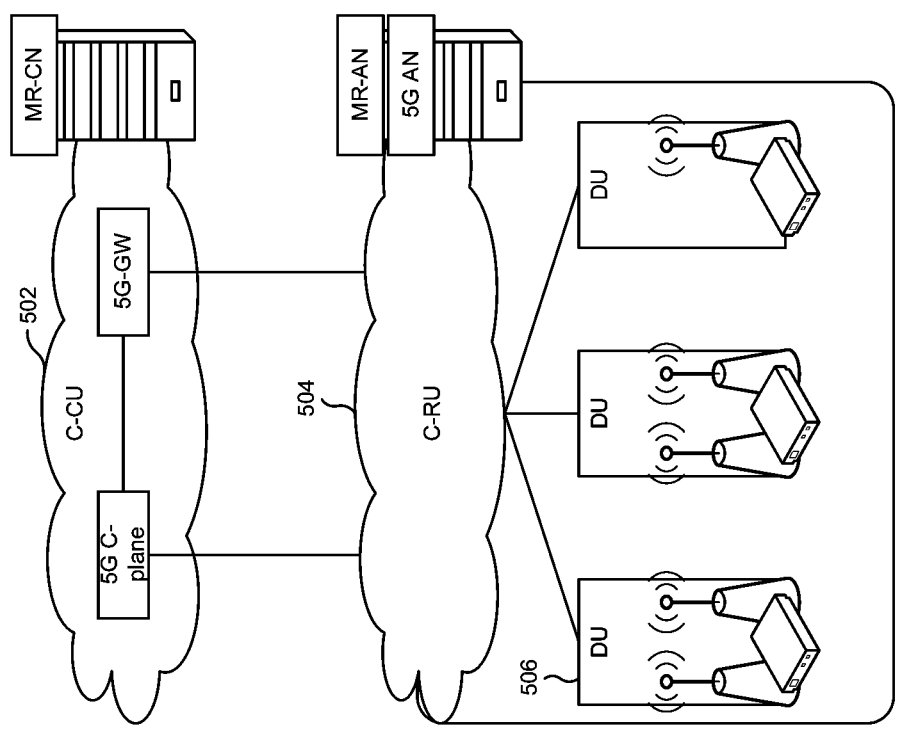
FIG. 5 illustrates an example physical architecture of a distributed RAN, in accordance with various aspects of the present disclosure.

FIG. 5 illustrates an example physical architecture of a distributed RAN 500, according to aspects of the present disclosure. A centralized core network unit (C-CU) 502 may host core network functions. The C-CU may be centrally deployed. C-CU functionality may be offloaded (e.g., to advanced wireless services (AWS)), in an effort to handle peak capacity.

A centralized RAN unit (C-RU) 504 may host one or more ANC functions. Optionally, the C-RU may host core network functions locally. The C-RU may have distributed deployment. The C-RU may be closer to the network edge.

A distributed unit (DU) 506 may host one or more TRPs. The DU may be located at edges of the network with radio frequency (RF) functionality.

As indicated above, FIG. 5 is provided as an example. Other examples may differ from what is described with regard to FIG. 5.

In some cases, a UE (e.g., UE 120) may communicate with a plurality of TRPs (e.g., BSs 110, TRPs 408, DUs 506, and/or the like) in a multi-TRP and/or multi-panel configuration. In a multi-TRP configuration, the UE may be communicatively connected with a plurality of TRPs, and may receive downlink communications (e.g., PDCCH communications, PDSCH communications, and/or the like) from each of the plurality of TRPs.

In some cases, the UE may be scheduled to receive downlink communications in the multi-TRP configuration via single PDCCH scheduling. In single PDCCH scheduling, a single PDCCH communication including downlink control information (DCI) from a TRP schedules PDSCH communications from a plurality of TRPs in the multi-TRP configuration. The single PDCCH communication may identify a plurality of transmission configuration indication (TCI) states. The PDSCH communications from the plurality of TRPs may be spatial division multiplexed, time division multiplexed, and/or frequency division multiplexed across the plurality of TCI states. In some cases, the UE may be scheduled to receive downlink communications in the multi-TRP configuration via multi-PDCCH scheduling. In multi-PDCCH scheduling, a first PDCCH communication including DCI from a first TRP schedules PDSCH communications from the first TRP, and a second PDCCH communication including DCI from a second TRP schedules PDSCH communications from the second TRP. Each PDCCH communication may identify one or more TCI states.

TRPs in a multi-TRP configuration may be associated with the same cell or BS, which may be referred to as intra-cell multi-TRP. In intra-cell multi-TRP, the TRPs may be associated with the same PCI (e.g., the PCI of the cell) and may correspond to different panels of the cell. TRPs in a multi-TRP configuration may be associated with different cells or BSs, which may be referred to as inter-cell multi-TRP. In inter-cell multi-TRP, the TRPs may be associated with different PCIs (e.g., PCIs of the respective cells associated with each TRP).

A UE may be configured to measure SSBs associated with a TRP. For example, a UE may perform L1-RSRP measurements and/or other measurements associated with one or more SSBs of the TRP, and may provide the L1-RSRP measurements to the TRP in an L1-RSRP measurement report. However, in an inter-cell multi-TRP configuration, where TRPs are associated with different PCIs, a UE may be unable to provide L1-RSRP measurements for a plurality of TRPs in the same L1-RSRP measurement report. Moreover, if the UE provides an L1-RSRP measurement report with L1-RSRP measurements associated with a TRP in a multi-TRP configuration, the UE may be unable to indicate which TRP is associated with the L1-RSRP measurements in the L1-RSRP measurement report. As an example, each TRP in an inter-cell multi-TRP configuration may be configured with up to 64 SSB indexes (e.g., 0-63) corresponding to 64 SSBs. If the UE includes L1-RSRP measurements associated with SSB index 34, it may be ambiguous as to which TRP in the inter-cell multi-TRP configuration is associated with SSB index 34 because each of the TRPs in the inter-cell multi-TRP configuration may have a corresponding SSB index 34.

Some implementations described herein provide techniques and apparatuses for inter-cell L1-RSRP reporting. A UE may generate an L1-RSRP measurement report associated with an inter-cell multi-TRP configuration. In some aspects, the UE may generate the L1-RSRP measurement report to identify L1-RSRP measurements associated with one or more SSBs included in an SSB set. The L1-RSRP measurement report may include an SSB set indicator that identifies the SSB set among a plurality SSB sets. Each of the plurality of SSB sets may be associated with a respective TRP (and thus, a respective PCI). In this way, the SSB set indicator mitigates ambiguity as to which TRP SSB set the SSB indexes associated with the one or more SSBs index into.

In some aspects, the UE may generate the L1-RSRP measurement report to identify L1-RSRP measurements associated a plurality of SSB sets, where each SSB set is associated with a respective PCI. In this way, the UE is capable of providing L1-RSRP measurements associated with a plurality of TRPs (e.g., TRPs in the inter-cell multi-TRP configuration) in the same L1-RSRP measurement report.

Figure 6A:
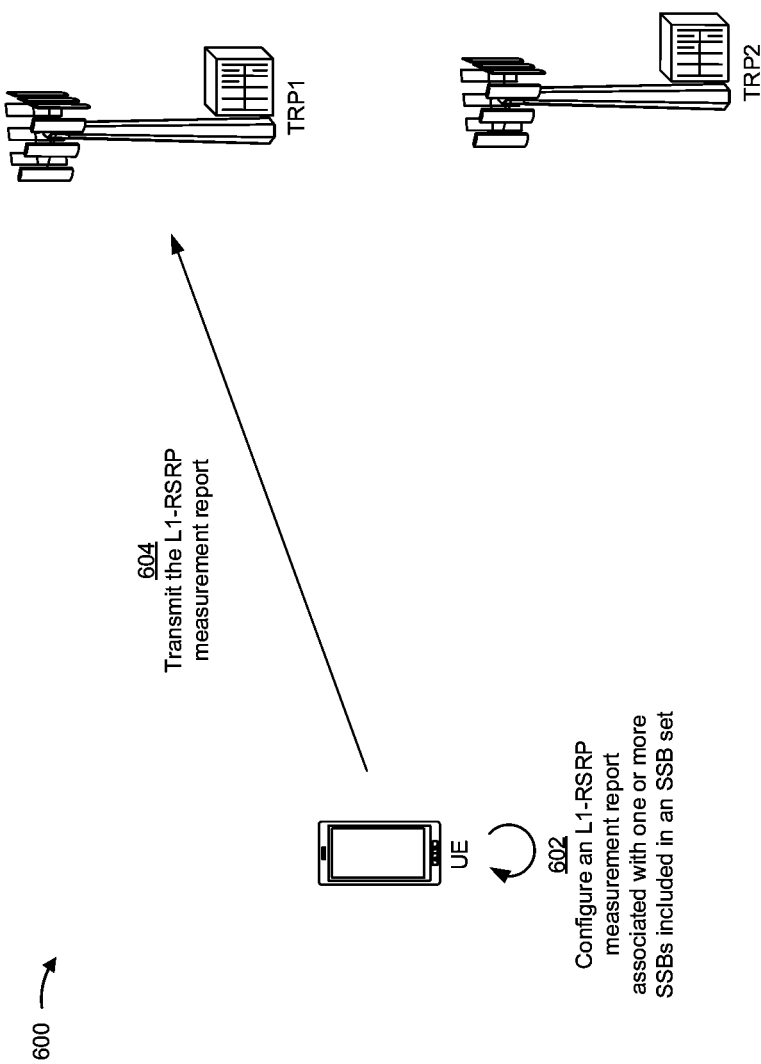

FIGS. 6A and 6B are diagrams illustrating one or more examples 600 of inter-cell L1-RSRP reporting, in accordance with various aspects of the present disclosure. As shown in FIG. 6A, example(s) 600 may include communication between a UE (e.g., UE 120) and a TRP (e.g., BS 110, TRP 408, DU 506, and/or the like). In some aspects, the TRP (e.g., TRP1) may be included in an inter-cell multi-TRP configuration with one or more other TRPs (e.g., TRP2 and/or other TRPs). The TRP and the one or more other TRPs may transmit downlink communications to the UE in the inter-cell multi-TRP configuration. In some aspects, TRP1 may be associated with a serving cell of the UE, and TRP2 may be associated with a non-serving cell of the UE.

In some aspects, the UE may perform various measurements associated with the TRPs included in the inter-cell multi-TRP configuration, such as TRP1, TRP2, and/or the like. In some aspects, the measurements may include L1-RSRP measurements based on a channel state information reference signal (CSI-RS) transmitted by TRP1. In some aspects, the measurements may include L1-RSRP measurements based on a an SSB transmitted by TRP1. In some aspects, each SSB associated with TRP1 may correspond to a different antenna panel of TRP1, may correspond to a different beam transmitted by TRP1, and/or the like. In some aspects, the various measurements may include other types of measurements, such as RSRQ measurements, RSSI measurements, and/or the like.

As shown in FIG. 6A, and by reference number 602, the UE may generate an L1-RSRP measurement report associated with one or more SSBs included in an SSB set. The SSB set may be a set of SSBs associated with TRP1 (e.g., may be associated with a PCI of TRP1). In some aspects, the UE may generate the L1-RSRP measurement report to further include an indication of an SSB resource indicator (SSBRI) associated with each of the one or more SSBs identified in the L1-RSRP measurement report.

In some aspects, each of the one or more SSBs (and associated L1-RSRP measurements) may be identified in the L1-RSRP measurement report by a respective SSB index. In some aspects, each TRP in an inter-cell multi-TRP configuration may be associated with an SSB set that includes the same SSB index numbering scheme. For example, TRP1 may be associated with an SSB set including SSB indexes 0-63, TRP2 may be associated with another SSB set that also includes SSB indexes 0-63, and so on.

Accordingly, to indicate which SSB set (and which associated TRP and PCI) is associated with the L1-RSRP measurements included in the L1-RSRP measurement report, the UE may generate the L1-RSRP measurement report to include an SSB set indicator that identifies the SSB set. In the example illustrated in FIG. 6A, the UE may configure the SSB set indicator to identify the SSB set associated with TRP1 (e.g., may configure a value for the SSB set indicator that is associated with TRP1). In this way, the SSB indexes identified in the L1-RSRP measurement report may index into the SSB set identified by the SSB set indicator.

As further shown in FIG. 6A, and by reference number 604, the UE may transmit the L1-RSRP measurement report to TRP1 and/or other TRPs. For example, the UE may transmit the L1-RSRP measurement report on an uplink channel and in a physical uplink control channel (PUCCH) communication, in a physical uplink shared channel (PUSCH) communication, in uplink control information (UCI), and/or the like.

FIG. 6B illustrates an example CSI-SSB-ResourceSet configuration that may be used to configure the UE with SSB indexes and SSB sets associated with a plurality of TRPs. As shown FIG. 6B, the example CSI-SSB-ResourceSet configuration may include an SSB-SET field that may identify an SSB set of a plurality of SSB sets. Thus, the SSB-SET field may be used to identify an SSB set associated with a particular TRP (e.g., based at least in part on the integer value configured for the SSB-SET field) from other SSB sets associated with other TRPs.

As further shown in FIG. 6B, the example CSI-SSB-ResourceSet configuration may include a CSI-SSB-ResourceList field that configures SSB indexes for the SSB set identified by the SSB-SET field included in the example CSI-SSB-ResourceSet configuration. For example, the CSI-SSB-ResourceList field may configure up to a particular quantity of SSB indexes (e.g., 64 and/or another quantity) for the SSB set.

In some aspects, a TRP (e.g., TRP1, TRP2, and/or the like) may transmit the example CSI-SSB-ResourceSet configuration to the UE in a downlink communication through a radio resource control (RRC) configuration and the UE may generate the L1-RSRP measurement report based at least in part on the example CSI-SSB-ResourceSet configuration. In some aspects, the UE may generate the L1-RSRP measurement report based at least in part on other CSI-SSB-ResourceSet configurations.

In this way, the UE may generate the L1-RSRP measurement report to identify L1-RSRP measurements associated with one or more SSBs included in an SSB set associated with TRP1 (e.g., associated with the PCI of TRP1). The L1-RSRP measurement report may include an SSB set indicator that identifies the SSB set among a plurality SSB sets (e.g., where each of the plurality of SSB sets is associated with a respective TRP in an inter-cell multi-TRP configuration). In this way, the SSB set indicator mitigates ambiguity as to which SSB set the SSB indexes, associated with the one or more SSBs, index into.

As indicated above, FIGS. 6A and 6B are provided as one or more examples. Other examples may differ from what is described with respect to FIGS. 6A and 6B.

Figure 7A:
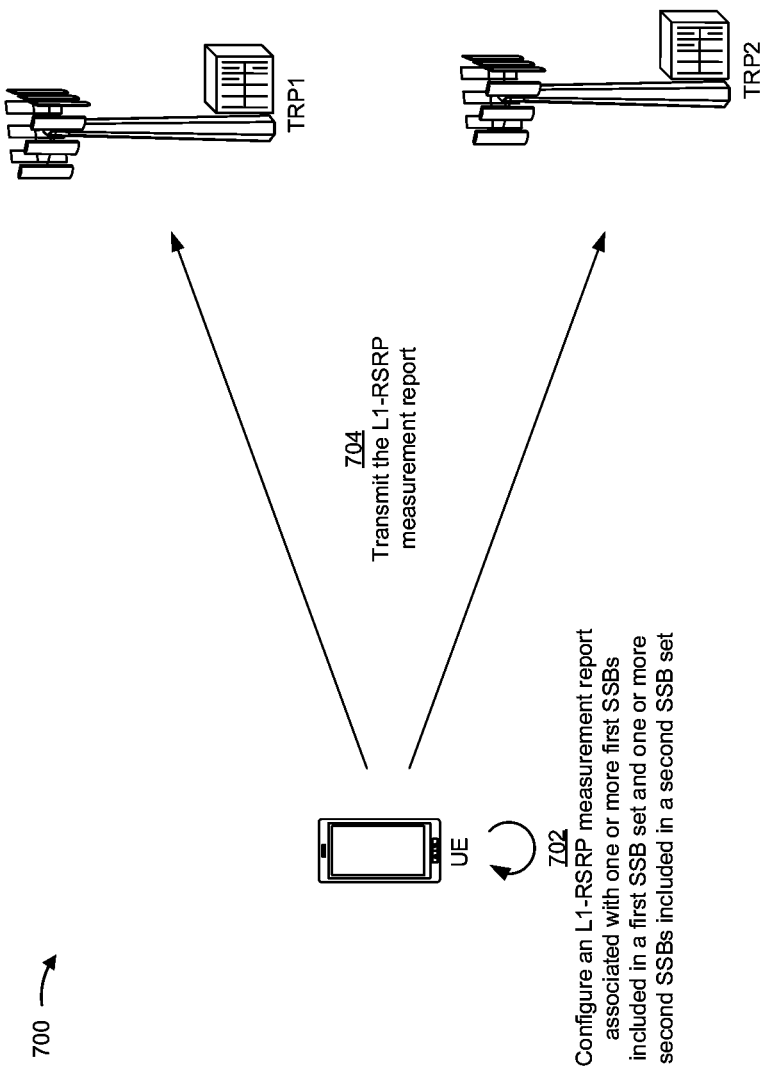

FIGS. 7A-7E are diagrams illustrating one or more examples 700 of inter-cell L1-RSRP reporting, in accordance with various aspects of the present disclosure. As shown in FIG. 7A, example(s) 700 may include communication between a UE (e.g., UE 120) and a plurality of TRPs (e.g., BS 110, TRP 408, DU 506, and/or the like). In some aspects, the TRP (e.g., TRP1) may be included in an inter-cell multi-TRP configuration with one or more other TRPs (e.g., TRP2 and/or other TRPs). The TRP and the one or more other TRPs may transmit downlink communications to the UE in the inter-cell multi-TRP configuration. In some aspects, TRP1 may be associated with a serving cell of the UE, and TRP2 may be associated with a non-serving cell of the UE.

In some aspects, the UE may perform various measurements associated with the TRPs included in the inter-cell multi-TRP configuration, such as TRP1, TRP2, and/or the like. In some aspects, the measurements may include L1-RSRP measurements based on a channel state information reference signal (CSI-RS) transmitted by TRP1. In some aspects, the measurements may include L1-RSRP measurements based on an SSB transmitted by TRP1. In some aspects, each SSB associated with TRP1 may correspond to a different antenna panel of TRP1, may correspond to a different beam transmitted by TRP1, and/or the like. In some aspects, the various measurements may include other types of measurements, such as RSRQ measurements, RSSI measurements, and/or the like.

As shown in FIG. 7A, and by reference number 702, the UE may generate an L1-RSRP measurement report associated with a plurality of SSB sets. Each of the plurality of SSB sets may be associated with a different PCI (and thus, a different TRP). For example, the UE may generate the L1-RSRP measurement report to identify L1-RSRP measurements associated with one or more first SSBs included in a first SSB set associated with the PCI of TRP1, may generate the L1-RSRP measurement report to identify L1-RSRP measurements associated with one or more second SSBs included in a second SSB set associated with the PCI of TRP2, and so on.

In some aspects, the UE may generate the L1-RSRP measurement report to further include an indication of an SSBRI associated with each of the one or more first SSBs and the one or more second SSBs identified in the L1-RSRP measurement report. In some aspects, if group based beam reporting is enabled for the UE, the UE may generate the L1-RSRP measurement report to further include an indication of a beam pair that the UE is capable of simultaneously receiving. The beam pair may include one or more beams associated with TRP1 and/or one or more beams associated with TRP2. For example, the beam pair may include a beam associated with an SSB included in the one or more first SSBs and another beam associated with an SSB included in the one or more second SSBs. As another example, the beam pair may include a beam associated with an SSB included in the one or more first SSBs and another beam associated with another SSB included in the one or more first SSBs.

In some aspects, the UE may generate the L1-RSRP measurement report to identify the beam pair based at least in part on the beams, included in the beam pair, being associated with SSBs that are included in different SSB sets identified in the L1-RSRP measurement report. In some aspects, the UE may generate the L1-RSRP measurement report to identify the beam pair regardless of whether the beams, included in the beam pair, are associated with SSBs that are included in different SSB sets. In some aspects, the determination of whether to identify the beam pair based at least in part on whether the beams, included in the beam pair, are associated with SSBs that are included in different SSB sets may be configurable by one or more of the TRPs included in the inter-cell multi-TRP configuration.

In some aspects, the UE may generate the L1-RSRP measurement report to explicitly identify the L1-RSRP measurements of the beams (e.g., L1-RSRP measurements that are based at least in part on the SSBs transmitted on the beams) that are included in the beam pair identified in the L1-RSRP measurement report. The L1-RSRP measurements of the beams may be quantized to a 7-bit value (or another quantity of bits) in a decibel-milliwatt (dBm) range (e.g., [−140, −44] dBm) and with a particular dB step size (e.g., 1 dB step size).

In some aspects, the UE may generate the L1-RSRP measurement report to explicitly identify an L1-RSRP measurement of a first beam in the beam pair, and may generate the L1-RSRP measurement report to identify an L1-RSRP measurement of a second beam in the beam pair as a differential value relative to the L1-RSRP measurement of the first beam. The differential value may be quantized to a particular quantity of bits (e.g., 4 bits, 5 bits or more, and/or the like).

In some aspects, explicit and/or differential L1-RSRP measurement for the beam pair is configurable for the UE by one or more of the TRPs in the inter-cell multi-TRP configuration. For example, the inter-cell multi-TRP configuration may indicate that the UE is to configure the L1-RSRP measurement report to explicitly indicate the L1-RSRP measurement of the second beam in the beam pair (e.g., quantized to a 7-bit value), to implicitly indicate the L1-RSRP measurement of the second beam in the beam pair as a 4-bit differential value, or to implicitly indicate the L1-RSRP measurement of the second beam in the beam pair as a 5 or more bit differential value. In some aspects, the UE determines whether to use explicit and/or differential L1-RSRP measurement for the beam pair based at least in part on whether the beams included in the beam pair are associated with SSBs that are included in the same SSB set or different SSB sets. For example, the UE may determine whether to configure the L1-RSRP measurement report to explicitly indicate the L1-RSRP measurement of the second beam in the beam pair (e.g., quantized to a 7-bit value), to implicitly indicate the L1-RSRP measurement of the second beam in the beam pair as a 4-bit differential value, or to implicitly indicate the L1-RSRP measurement of the second beam in the beam pair as a 5 or more bit differential value based at least in part on whether the beams included in the beam pair are associated with SSBs that are included in the same SSB set or different SSB sets.

In some aspects, the UE may use differential L1-RSRP measurement reporting for group-based beam reporting, where UE reports a beam pair than can be received simultaneously, as described above. In this case, the L1-RSRP measurement report may include, for each beam of the beam pair, an SSBRI and RSRP value. In some aspects, the UE may use differential L1-RSRP measurement reporting for non-group-based beam reporting (e.g., if nrofReportedRS>1). In this case, the UE may report the first nrofReportedRS strongest beams, and for each beam the UE may report the SSBRI and RSRP value where the value for the second, third, and so on are differential.

As further shown in FIG. 7A, and by reference number 704, the UE may transmit the L1-RSRP measurement report to TRP1, TRP2, and/or other TRPs. For example, the UE may transmit the L1-RSRP measurement report on an uplink channel and in one or more PUCCH communications, in one or more PUSCH communications, in UCI, and/or the like.

FIGS. 7B-7E illustrate various examples of L1-RSRP reporting configurations that may be used to configure the UE with SSB indexes and SSB sets associated with a plurality of TRPs. In some aspects, a TRP (e.g., TRP1, TRP2, and/or the like) may transmit one or more of the example L1-RSRP reporting configurations to the UE in a downlink communication (e.g., PDCCH communication, PDSCH communication, and/or the like), and the UE may generate the L1-RSRP measurement report based at least in part on the one or more example L1-RSRP reporting configurations. In some aspects, the UE may generate the L1-RSRP measurement report based at least in part on other L1-RSRP reporting configurations.

As shown FIG. 7B, an example L1-RSRP reporting configuration may include a CSI-SSB-ResourceSet configuration and an SSB-IndexandSet field. The CSI-SSB-ResourceSet configuration may include a CSI-SSB-ResourceList field that identifies a common SSB index range for TRP1 and TRP2. For example, the CSI-SSB-ResourceList field may identify up to 128 SSB indexes (e.g., SSB index 0-127) that are configured for TRP1 and TRP2.

The SSB-IndexandSet field may assign subsets of the common SSB index range to TRP1 and TRP2. For example, the SSB-IndexandSet field may indicate a threshold quantity of SSB indexes (e.g., maxNrofSSBs-1), such as 63, where SSB indexes equal to or less than the threshold quantity of SSB indexes may be assigned to a first TRP (e.g., to the PCI associated with TRP1), and SSB indexes greater than the threshold quantity of SSB indexes may be assigned to a second TRP (e.g., to the PCI associated with TRP2). In this way, TRP1 is assigned an SSB index range of 0-63 for the first SSB set associated with TRP1, and TRP2 is assigned an SSB index range of 64-127 for the second SSB set associated with TRP2, such that the SSB index ranges are non-overlapping.

In some aspects, the SSB indexes, included in the common SSB index range, above the threshold quantity of SSB indexes may relative SSB indexes. In this case, the actual SSB indexes in the SSB index range assigned to TRP2 may be determined relative to maxNrofSSBs. As an example, TRP2 may assign an actual SSB index 4 to an SSB transmitted by TRP2. The relative SSB index, in the common SSB index range, corresponding to SSB index 4 may be determined by adding maxNrofSSBs (e.g., 64 in this example) to SSB index 4, which may result in a relative SSB index 68. Thus, if a relative SSB index value is greater than the threshold quantity of SSB indexes, the relative SSB index value is an implicit indication that the actual SSB index corresponding to the relative SSB index is included in the SSB index range assigned to TRP2.

In some aspects, the UE may generate the L1-RSRP measurement report such that the one or more first SSBs are identified in the L1-RSRP measurement report by respective SSB indexes included in the first SSB index range associated with the first SSB set (e.g., {0, 4, 50}), and the one or more second SSBs are identified in the L1-RSRP measurement report by SSB indexes included in the second SSB index range associated with the second SSB set. As indicated above, the SSB indexes associated with the one or more first SSBs and the SSB indexes associated with the one or more second SSBs may be indicated on the common SSB index range that includes the first SSB index range and the second SSB index range. Because the SSB indexes associated with the one or more second SSBs are greater than the threshold quantity of SSB indexes, the SSB indexes associated with the one or more second SSBs may be indicated in the L1-RSRP measurement report as relative SSB indexes (e.g., {67, 68, 100}, which may correspond to actual SSB indexes of {3, 4, 36}).

Figure 7C:

As shown FIG. 7C, an example L1-RSRP reporting configuration may include a CSI-SSB-ResourceSet configuration and an SSB-IndexandSet configuration. The CSI-SSB-ResourceSet configuration may include a CSI-SSB-ResourceList field that identifies a common SSB index range for TRP1 and TRP2. For example, the CSI-SSB-ResourceList field may identify up to 64 SSB indexes (e.g., SSB index 0-63) that are configured for TRP1 and TRP2.

The SSB-IndexandSet configuration may assign SSB indexes in the common SSB index range to TRP1 and TRP2. For example, the SSB-IndexandSet configuration may include an SSB-Index field that identifies the SSB indexes, included in the common SSB index range, that are included in an SSB set identified by an SSB-Set field included in the SSB-IndexandSet configuration. As an example, the SSB-Set field may include a 0 value, which may correspond to the first SSB set associated with TRP1, and the SSB-Index field may identify the SSB indexes included in the first SSB set. The SSB-IndexandSet configuration may include a plurality of sets of SSB-Index and SSB-Set fields for each TRP.

In this case, the UE may generate the L1-RSRP measurement report such that each of the one or more first SSBs is identified in the L1-RSRP measurement report by an indication of the first SSB set and an indication of an SSB index that indexes into the first SSB set, and such that each of the one or more second SSBs is identified in the L1-RSRP measurement report by an indication of the second SSB set and an indication of an SSB index that indexes into the second SSB set. For example, each of the one or more first SSBs may be identified in the L1-RSRP measurement report by a plurality of values that includes a value identifying the first SSB set and a value identifying an SSB index that indexes into the first SSB set (e.g., {(0,0),(4,0),(50,0)}), where the second value identifies the first SSB set and the first value identifies the SSB index in the first SSB set). As another example, each of the one or more second SSBs may be identified in the L1-RSRP measurement report by a plurality of values that includes a value identifying the second SSB set and a value identifying an SSB index that indexes into the second SSB set (e.g., {(1,1),(2,1),(36,1)}), where the second value identifies the second SSB set and the first value identifies the SSB index in the second SSB set).

As shown FIG. 7D, an example L1-RSRP reporting configuration may include a CSI-SSB-ResourceSet configuration that includes a plurality of CSI-SSB-ResourceList fields. Each CSI-SSB-ResourceList field may identify an SSB set associated with a particular TRP. For example, CSI-SSB-ResourceList0 may identify the first SSB set associated with TRP1, and CSI-SSB-ResourceList1 may identify the second SSB set associated with TRP2. In this case, the UE may generate the L1-RSRP measurement report such that the one or more first SSBs are identified by a first CSI-SSB-ResourceList field included in the L1-RSRP measurement report (e.g., CSI-SSB-ResourceList0) and the one or more second SSBs are identified by a second CSI-SSB-ResourceList field included in the L1-RSRP measurement report (e.g., CSI-SSB-ResourceList1).

Moreover, if the UE reports SSBRIs associated with the SSBs identified in the L1-RSRP measurement report, an SSBRI associated with a particular SSB may be identified by a first value that identifies the CSI-SSB-ResourceList in which the SSB is included, and by a second value that identifies the SSB index associated with the SSB. The second value, which may be referred to ask, may index into the CSI-SSB-ResourceList identified by the first value, and may correspond to the (k+1)-th entry of the corresponding CSI-SSB-ResourceList.

As shown FIG. 7E, an example L1-RSRP reporting configuration may include a CSI-SSB-ResourceSet configuration and a CSI-SSB-ResourceList configuration. The CSI-SSB-ResourceSet configuration may include a CSI-SSB-ResourceListSet field that identifies a quantity of CSI-SSB-ResourceList fields included in the CSI-SSB-ResourceList configuration.

Each CSI-SSB-ResourceList field may include an SSB-Set field and a resourceList field. The SSB-Set field may identify the SSB set associated with the CSI-SSB-ResourceList field, and the resourceList field may identify the SSB indexes, included in the SSB set identified by the SSB-Set field, that are included in the CSI-SSB-ResourceList field. This permits the UE to include multiple CSI-SSB-ResourceList fields for the same SSB set in the L1-RSRP measurement report, which enables group based beam reporting at the UE, enables the UE to identify SSB indexes for different antenna panels or beams for the same TRP, and/or the like.

As an example, the UE may generate the L1-RSRP measurement report such that a first subset of the one or more first SSBs is identified by a first CSI-SSB-ResourceList field included in the L1-RSRP measurement report, and may generate the L1-RSRP measurement report such that a second subset of the one or more first SSBs is identified by a second CSI-SSB-ResourceList field included in the L1-RSRP measurement report. As another example, the UE may generate the L1-RSRP measurement report such that a subset of the one or more first SSBs is identified by a first CSI-SSB-ResourceList field included in the L1-RSRP measurement report, and may generate the L1-RSRP measurement report such that a subset of the one or more second SSBs is identified by a second CSI-SSB-ResourceList field included in the L1-RSRP measurement report.

Moreover, if the UE reports SSBRIs associated with the SSBs identified in the L1-RSRP measurement report, an SSBRI associated with a particular SSB may be identified by a first value that identifies the CSI-SSB-ResourceList in which the SSB is included, and by a second value that identifies the SSB index associated with the SSB. The second value, which may be referred to as k, may index into the CSI-SSB-ResourceList identified by the first value, and may correspond to the (k+1)-th entry of the corresponding CSI-SSB-ResourceList.

In this way, the UE may generate the L1-RSRP measurement report to identify L1-RSRP measurements associated a plurality of SSB sets, where each SSB set is associated with a respective PCI (e.g., where each PCI is associated with a respective TRP). In this way, the UE is capable of providing L1-RSRP measurements associated with a plurality of TRPs (e.g., TRPs in the inter-cell multi-TRP configuration) in the same L1-RSRP measurement report.

As indicated above, FIGS. 7A-7E are provided as one or more examples. Other examples may differ from what is described with respect to FIGS. 7A-7E.

Figure 8:
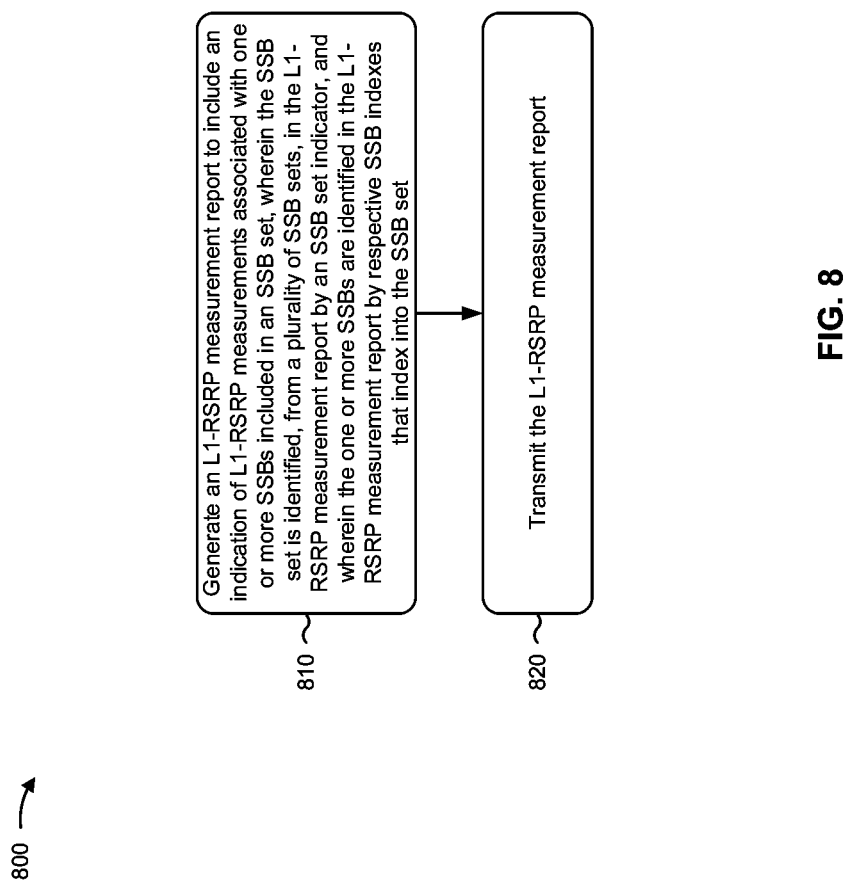
FIGS. 8 and 9 are diagrams illustrating example processes performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120) performs operations associated with inter-cell L1-RSRP reporting.

As shown in FIG. 8, in some aspects, process 800 may include generating an L1-RSRP measurement report to include an indication of L1-RSRP measurements associated with one or more SSBs included in an SSB set, wherein the SSB set is identified, from a plurality of SSB sets, in the L1-RSRP measurement report by an SSB set indicator, and wherein the one or more SSBs are identified in the L1-RSRP measurement report by respective SSB indexes that index into the SSB set (block 810). For example, the UE (e.g., using receive processor 258, transmit processor 264, controller/processor 280, memory 282, and/or the like) may generate an L1-RSRP measurement report to include an indication of L1-RSRP measurements associated with one or more SSBs included in an SSB set, as described above. In some aspects, the SSB set is identified, from a plurality of SSB sets, in the L1-RSRP measurement report by an SSB set indicator. In some aspects, the one or more SSBs are identified in the L1-RSRP measurement report by respective SSB indexes that index into the SSB set.

As further shown in FIG. 8, in some aspects, process 800 may include transmitting the L1-RSRP measurement report (block 820). For example, the UE (e.g., using receive processor 258, transmit processor 264, controller/processor 280, memory 282, and/or the like) may transmit the L1-RSRP measurement report, as described above.

Process 800 may include additional aspects, such as any single aspect or any combination of aspects described below and/or in connection with one or more other processes described elsewhere herein.

In a first aspect, the SSB set is associated with a first PCI and another SSB set of the plurality of SSB sets is associated with a second PCI. In a second aspect, alone or in combination with the first aspect, the first PCI is associated with a serving cell of the UE and the second PCI is associated with a non-serving cell of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
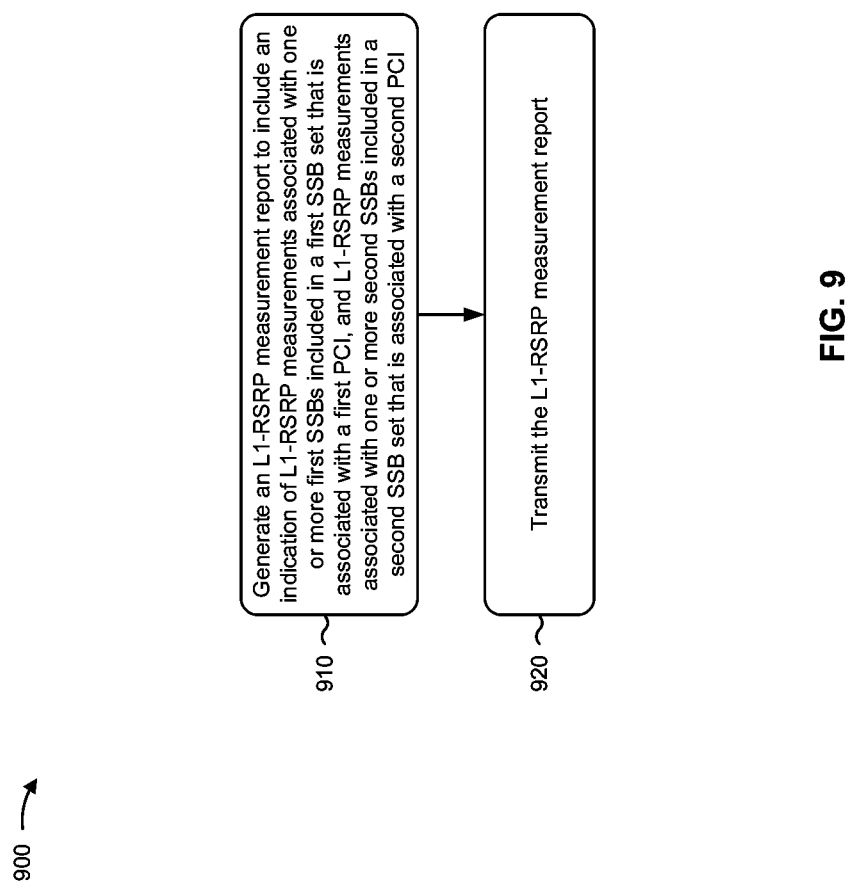

FIG. 9 is a diagram illustrating an example process 900 performed, for example, by a UE, in accordance with various aspects of the present disclosure. Example process 900 is an example where the UE (e.g., UE 120) performs operations associated with inter-cell L1-RSRP reporting.

As shown in FIG. 9, in some aspects, process 900 may include generating an L1-RSRP measurement report to include an indication of L1-RSRP measurements associated with one or more first SSBs included in a first SSB set that is associated with a first PCI, and L1-RSRP measurements associated with one or more second SSBs included in a second SSB set that is associated with a second PCI (block 910). For example, the UE (e.g., using receive processor 258, transmit processor 264, controller/processor 280, memory 282, and/or the like) may generate an L1-RSRP measurement report to include an indication of L1-RSRP measurements associated with one or more first SSBs included in a first SSB set that is associated with a first PCI, and L1-RSRP measurements associated with one or more second SSBs included in a second SSB set that is associated with a second PCI, as described above.

As further shown in FIG. 9, in some aspects, process 900 may include transmitting the L1-RSRP measurement report (block 920). For example, the UE (e.g., using receive processor 258, transmit processor 264, controller/processor 280, memory 282, and/or the like) may transmit the L1-RSRP measurement report, as described above.

Process 900 may include additional aspects, such as any single aspect or any combination of aspects described below and/or in connection with one or more other processes described elsewhere herein.

In a first aspect, the first PCI is associated with a serving cell of the UE and the second PCI is associated with a non-serving cell of the UE. In a second aspect, alone or in combination with the first aspect, the one or more first SSBs are identified in the L1-RSRP measurement report by respective SSB indexes included in a first SSB index range associated with the first SSB set, the one or more second SSBs are identified in the L1-RSRP measurement report by respective relative SSB indexes included in a second SSB index range associated with the second SSB set, and the first SSB index range and the second SSB index range are non-overlapping SSB index ranges.

In a third aspect, alone or in combination with one or more of the first and second aspects, respective actual SSB indexes associated with the one or more second SSBs are based at least in part on the respective relative SSB indexes and a quantity of SSB indexes included in the first SSB index range. In a fourth aspect, alone or in combination with one or more of the first through third aspects, each of the one or more first SSBs is identified in the L1-RSRP measurement report by an indication of the first SSB set and an indication of an SSB index that indexes into the first SSB set and each of the one or more second SSBs is identified in the L1-RSRP measurement report by an indication of the second SSB set and an indication of an SSB index that indexes into the second SSB set.

In a fifth aspect, alone or in combination with one or more of the first through fourth aspects, each of the one or more first SSBs is identified in the L1-RSRP measurement report by a first plurality of values that includes first value identifying the first SSB set and a second value identifying an SSB index that indexes into the first SSB set, and each of the one or more second SSBs is identified in the L1-RSRP measurement report by a second plurality of values that includes a first value identifying the second SSB set and a second value identifying an SSB index that indexes into the second SSB set. In a sixth aspect, alone or in combination with one or more of the first through fifth aspects, the one or more first SSBs are identified by a first CSI-SSB-ResourceSet field included in the L1-RSRP measurement report and the one or more second SSBs are identified by a second CSI-SSB-ResourceSet field included in the L1-RSRP measurement report.

In a seventh aspect, alone or in combination with one or more of the first through sixth aspects, process 900 includes generating the L1-RSRP measurement report to include a plurality of values that is identifying an SSB resource indicator associated with a third SSB included in the one or more first SSBs, the plurality of values including a first is valuing identifying the first CSI-SSB-ResourceSet field, and a second is valuing identifying an SSB index, associated with the third SSB, that indexes into the first CSI-SSB-ResourceSet field. In an eighth aspect, alone or in combination with one or more of the first through seventh aspects, a first subset of the one or more first SSBs is identified by a first CSI-SSB-ResourceList field included in the L1-RSRP measurement report, a second subset of the one or more first SSBs is identified by a second CSI-SSB-ResourceList field included in the L1-RSRP measurement report, and the first CSI-SSB-ResourceList field and the second CSI-SSB-ResourceList field are identified by a CSI-SSB-ResourceListSet field included in the L1-RSRP measurement report.

In a ninth aspect, alone or in combination with one or more of the first through eighth aspects, process 900 includes generating the L1-RSRP measurement report to include a plurality of values that is identifying an SSB resource indicator associated with a third SSB included in the first subset of the one or more first SSBs, the plurality of values including a first is valuing identifying the first CSI-SSB-ResourceList field, and a second is valuing identifying an SSB index, associated with the third SSB, that indexes into the first CSI-SSB-ResourceList field. In a tenth aspect, alone or in combination with one or more of the first through ninth aspects, a subset of the one or more first SSBs is identified by a first CSI-SSB-ResourceList field included in the L1-RSRP measurement report, a subset of the one or more second SSBs is identified by a second CSI-SSB-ResourceList field included in the L1-RSRP measurement report, and the first CSI-SSB-ResourceList field and the second CSI-SSB-ResourceList field are identified by a CSI-SSB-ResourceListSet field included in the L1-RSRP measurement report.

In an eleventh aspect, alone or in combination with one or more of the first through tenth aspects, process 900 includes generating the L1-RSRP measurement report to include an indication of a beam pair that the UE is capable of simultaneously receiving, wherein the beam pair is including a first beam is associating with a third SSB included in the one or more first SSBs, and a second beam is associating with a fourth SSB included in the one or more first SSBs or the one or more second SSBs.

In a twelfth aspect, alone or in combination with one or more of the first through eleventh aspects, the fourth SSB is included in the one or more second SSBs and generating the L1-RSRP measurement report to include the indication of a beam pair comprises generating the L1-RSRP measurement report to include the indication of a beam pair based at least in part on the fourth SSB being included in the one or more second SSBs. In a thirteenth aspect, alone or in combination with one or more of the first through twelfth aspects, the fourth SSB is included in the one or more second SSBs and generating the L1-RSRP measurement report to include the indication of a beam pair comprises generating the L1-RSRP measurement report to include the indication of a beam pair based at least in part on the fourth SSB being identified in a CSI-SSB-ResourceList field, included in the L1-RSRP measurement report, that is different from a CSI-SSB-ResourceList field that identifies the third SSB.

In a fourteenth aspect, alone or in combination with one or more of the first through thirteenth aspects, an L1-RSRP measurement, associated with the second beam, is identified in the L1-RSRP measurement report as a differential value relative to an L1-RSRP measurement associated with the first beam. In a fifteenth aspect, alone or in combination with one or more of the first through fourteenth aspects, the differential value is quantized to a quantity of 4 bits. In a sixteenth aspect, alone or in combination with one or more of the first through fifteenth aspects, the differential value is quantized to a quantity of 5 or more bits. In a seventeenth aspect, alone or in combination with one or more of the first through sixteenth aspects, an L1-RSRP measurement associated with the first beam, and an L1-RSRP measurement associated with the second beam, are explicitly identified in the L1-RSRP measurement report by respective 7-bit values.

In an eighteenth aspect, alone or in combination with one or more of the first through seventeenth aspects, generating the L1-RSRP measurement report to include the indication of a beam pair includes generating, based at least in part on a configuration, the L1-RSRP measurement report to include a 7-bit value explicitly indicating an L1-RSRP measurement associated with the second beam, a 4-bit value implicitly indicating the L1-RSRP measurement associated with the second beam as a differential value relative to an L1-RSRP measurement associated with the first beam, or a 5 or more bit value implicitly indicating the L1-RSRP measurement associated with the second beam as the differential value relative to the L1-RSRP measurement associated with the first beam. In a nineteenth aspect, alone or in combination with one or more of the first through eighteenth aspects, generating the L1-RSRP measurement report to include the indication of a beam pair includes generating, based at least in part on whether the first beam and the second beam are included in a same SSB set, the L1-RSRP measurement report to include a 7-bit value explicitly indicating an L1-RSRP measurement associated with the second beam, a 4-bit value implicitly indicating the L1-RSRP measurement associated with the second beam as a differential value relative to an L1-RSRP measurement associated with the first beam, or a 5 or more bit value implicitly indicating the L1-RSRP measurement associated with the second beam as the differential value relative to the L1-RSRP measurement associated with the first beam.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   generating, for a same layer one reference signal received power (L1-RSRP) measurement report, indications of:
      L1-RSRP measurements associated with one or more first synchronization signal bocks (SSBs) included in a first SSB set that is associated with a first physical cell identifier (PCI), and
      L1-RSRP measurements associated with one or more second SSBs included in a second SSB set that is associated with a second PCI; and
   transmitting the L1-RSRP measurements associated with the one or more first SSBS and the L1-RSRP measurements associated with the one or more second SSBs in the same L1-RSRP measurement report.

2. The method of claim 1, wherein the first PCI is associated with a serving cell of the UE; and
   wherein the second PCI is associated with a non-serving cell of the UE.

3. The method of claim 1, wherein the one or more first SSBs are identified in the same L1-RSRP measurement report by respective SSB indexes included in a first SSB index range associated with the first SSB set; and
   wherein the one or more second SSBs are identified in the L1-RSRP measurement report by respective relative SSB indexes included in a second SSB index range associated with the second SSB set,
      wherein the first SSB index range and the second SSB index range are non-overlapping SSB index ranges.

4. The method of claim 3, wherein respective actual SSB indexes associated with the one or more second SSBs are based at least in part on:
   the respective relative SSB indexes, and
   a quantity of SSB indexes included in the first SSB index range.

5. The method of claim 1, wherein each of the one or more first SSBs is identified in the same L1-RSRP measurement report by an indication of the first SSB set and an indication of an SSB index that indexes into the first SSB set; and
   wherein each of the one or more second SSBs is identified in the same L1-RSRP measurement report by an indication of the second SSB set and an indication of an SSB index that indexes into the second SSB set.

6. The method of claim 1, wherein each of the one or more first SSBs is identified in the same L1-RSRP measurement report by a first plurality of values that includes:
   a first value identifying the first SSB set, and
   a second value identifying an SSB index that indexes into the first SSB set; and
   wherein each of the one or more second SSBs is identified in the same L1-RSRP measurement report by a second plurality of values that includes:
   a first value identifying the second SSB set, and
   a second value identifying an SSB index that indexes into the second SSB set.

7. The method of claim 1, wherein the one or more first SSBs are identified by a first CSI-SSB-ResourceList field included in the same L1-RSRP measurement report; and
   wherein the one or more second SSBs are identified by a second CSI-SSB-ResourceList field included in the same L1-RSRP measurement report.

8. The method of claim 7, further comprising:
   generating the same L1-RSRP measurement report to include:
      a plurality of values that identifies an SSB resource indicator associated with a third SSB included in the one or more first SSBs, the plurality of values including:
         a first value identifying the first CSI-SSB-ResourceList field, and
         a second value identifying an SSB index, associated with the third SSB, that indexes into the first CSI-SSB-ResourceList field.

9. The method of claim 1, wherein a first subset of the one or more first SSBs is identified by a first CSI-SSB-ResourceList field included in the same L1-RSRP measurement report;
   wherein a second subset of the one or more first SSBs is identified by a second CSI-SSB-ResourceList field included in the same L1-RSRP measurement report; and wherein the first CSI-SSB-ResourceList field and the second CSI-SSB-ResourceList field are identified by a CSI-SSB-ResourceListSet field included in the same L1-RSRP measurement report.

10. The method of claim 9, further comprising:
generating the same L1-RSRP measurement report to include:
a plurality of values that identifies an SSB resource indicator associated with a third SSB included in the first subset of the one or more first SSBs, the plurality of values including:
a first value identifying the first CSI-SSB-ResourceList field, and
a second value identifying an SSB index, associated with the third SSB, that indexes into the first CSI-SSB-ResourceList field.

11. The method of claim 1, wherein a subset of the one or more first SSBs is identified by a first CSI-SSB-ResourceList field included in the same L1-RSRP measurement report;
wherein a subset of the one or more second SSBs is identified by a second CSI-SSB-ResourceList field included in the same L1-RSRP measurement report; and
wherein the first CSI-SSB-ResourceList field and the second CSI-SSB-ResourceList field are identified by a CSI-SSB-ResourceListSet field included in the same L1-RSRP measurement report.

12. The method of claim 1, further comprising:
generating the same L1-RSRP measurement report to include an indication of a beam pair that the UE is capable of simultaneously receiving,
wherein the beam pair includes:
a first beam associated with a third SSB included in the one or more first SSBs, and
a second beam associated with a fourth SSB included in the one or more first SSBs or the one or more second SSBs.

13. The method of claim 12, wherein the fourth SSB is included in the one or more second SSBs; and
wherein generating the same L1-RSRP measurement report to include the indication of a beam pair comprises:
generating the same L1-RSRP measurement report to include the indication of a beam pair based at least in part on the fourth SSB being included in the one or more second SSBs.

14. The method of claim 12, wherein the fourth SSB is included in the one or more second SSBs; and
wherein generating the same L1-RSRP measurement report to include the indication of a beam pair comprises:
generating the same L1-RSRP measurement report to include the indication of a beam pair based at least in part on the fourth SSB being identified in a CSI-SSB-ResourceList field, included in the same L1-RSRP measurement report, that is different from a CSI-SSB-ResourceList field that identifies the third SSB.

15. The method of claim 12, wherein an L1-RSRP measurement, associated with the second beam, is identified in the same L1-RSRP measurement report as a differential value relative to an L1-RSRP measurement associated with the first beam.

16. The method of claim 15, wherein the differential value is quantized to a quantity of 4 bits.

17. The method of claim 15, wherein the differential value is quantized to a quantity of 5 or more bits.

18. The method of claim 12, wherein an L1-RSRP measurement associated with the first beam, and an L1-RSRP measurement associated with the second beam, are explicitly identified in the same L1-RSRP measurement report by respective 7-bit values.

19. The method of claim 12, wherein generating the same L1-RSRP measurement report to include the indication of a beam pair comprises:
generating, based at least in part on a configuration, the same L1-RSRP measurement report to include:
a 7-bit value explicitly indicating an L1-RSRP measurement associated with the second beam,
a 4-bit value implicitly indicating the L1-RSRP measurement associated with the second beam as a differential value relative to an L1-RSRP measurement associated with the first beam, or
a 5 or more bit value implicitly indicating the L1-RSRP measurement associated with the second beam as the differential value relative to the L1-RSRP measurement associated with the first beam.

20. The method of claim 12, wherein generating the same L1-RSRP measurement report to include the indication of a beam pair comprises:
generating, based at least in part on whether the first beam and the second beam are included in a same SSB set, the same L1-RSRP measurement report to include:
a 7-bit value explicitly indicating an L1-RSRP measurement associated with the second beam,
a 4-bit value implicitly indicating the L1-RSRP measurement associated with the second beam as a differential value relative to an L1-RSRP measurement associated with the first beam, or
a 5 or more bit value implicitly indicating the L1-RSRP measurement associated with the second beam as the differential value relative to the L1-RSRP measurement associated with the first beam.

21. A user equipment (UE) for wireless communication, comprising:
a memory; and
one or more processors coupled to the memory, the one or more processors configured to:
generate, for a same layer one reference signal received power (L1-RSRP) measurement report, indications of:
L1-RSRP measurements associated with one or more first synchronization signal bocks (SSBs) included in a first SSB set that is associated with a first physical cell identifier (PCI), and
L1-RSRP measurements associated with one or more second SSBs included in a second SSB set that is associated with a second PCI; and
transmit the L1-RSRP measurements associated with the one or more first SSBs and the L1-RSRP measurements associated with the one or more second SSBs in the same L1-RSRP measurement report.

22. The UE of claim 21, wherein the first PCI is associated with a serving cell of the UE; and
wherein the second PCI is associated with a non-serving cell of the UE.

23. The UE of claim 21, wherein the one or more first SSBs are identified in the same L1-RSRP measurement report by respective SSB indexes included in a first SSB index range associated with the first SSB set; and
wherein the one or more second SSBs are identified in the same L1-RSRP measurement report by respective relative SSB indexes included in a second SSB index range associated with the second SSB set,
wherein the first SSB index range and the second SSB index range are non-overlapping SSB index ranges.

24. The UE of claim 23, wherein respective actual SSB indexes associated with the one or more second SSBs are based at least in part on:
the respective relative SSB indexes, and
a quantity of SSB indexes included in the first SSB index range.

25. The UE of claim 21, wherein each of the one or more first SSBs is identified in the same L1-RSRP measurement report by an indication of the first SSB set and an indication of an SSB index that indexes into the first SSB set; and
wherein each of the one or more second SSBs is identified in the same L1-RSRP measurement report by an indication of the second SSB set and an indication of an SSB index that indexes into the second SSB set.

26. The UE of claim 21, wherein each of the one or more first SSBs is identified in the same L1-RSRP measurement report by a first plurality of values that includes:
a first value identifying the first SSB set, and
a second value identifying an SSB index that indexes into the first SSB set; and
wherein each of the one or more second SSBs is identified in the same L1-RSRP measurement report by a second plurality of values that includes:
a first value identifying the second SSB set, and
a second value identifying an SSB index that indexes into the second SSB set.

27. The UE of claim 21, wherein the one or more first SSBs are identified by a first CSI-SSB-ResourceList field included in the same L1-RSRP measurement report; and
wherein the one or more second SSBs are identified by a second CSI-SSB-ResourceList field included in the same L1-RSRP measurement report.

28. The UE of claim 27, wherein the one or more processors are further configured to:
generate the same L1-RSRP measurement report to include:
a plurality of values that identifies an SSB resource indicator associated with a third SSB included in the one or more first SSBs, the plurality of values including:
a first value identifying the first CSI-SSB-ResourceList field, and
a second value identifying an SSB index, associated with the third SSB, that indexes into the first CSI-SSB-ResourceList field.

29. The UE of claim 21, wherein a first subset of the one or more first SSBs is identified by a first CSI-SSB-ResourceList field included in the same L1-RSRP measurement report;
wherein a second subset of the one or more first SSBs is identified by a second CSI-SSB-ResourceList field included in the same L1-RSRP measurement report; and
wherein the first CSI-SSB-ResourceList field and the second CSI-SSB-ResourceList field are identified by a CSI-SSB-ResourceListSet field included in the same L1-RSRP measurement report.

30. The UE of claim 29, wherein the one or more processors are further configured to:
generate the same L1-RSRP measurement report to include:
a plurality of values that identifies an SSB resource indicator associated with a third SSB included in the first subset of the one or more first SSBs, the plurality of values including:
a first value identifying the first CSI-SSB-ResourceList field, and
a second value identifying an SSB index, associated with the third SSB, that indexes into the first CSI-SSB-ResourceList field.

31. The UE of claim 21, wherein a subset of the one or more first SSBs is identified by a first CSI-SSB-ResourceList field included in the same L1-RSRP measurement report;
wherein a subset of the one or more second SSBs is identified by a second CSI-SSB-ResourceList field included in the same L1-RSRP measurement report; and
wherein the first CSI-SSB-ResourceList field and the second CSI-SSB-ResourceList field are identified by a CSI-SSB-ResourceListSet field included in the same L1-RSRP measurement report.

32. The UE of claim 21, wherein the one or more processors are further configured to:
generate the same L1-RSRP measurement report to include an indication of a beam pair that the UE is capable of simultaneously receiving,
wherein the beam pair includes:
a first beam associated with a third SSB included in the one or more first SSBs, and
a second beam associated with a fourth SSB included in the one or more first SSBs or the one or more second SSBs.

33. The UE of claim 32, wherein the fourth SSB is included in the one or more second SSBs; and
wherein the one or more processors, when generating the same L1-RSRP measurement report, are configured to:
generate the same L1-RSRP measurement report to include the indication of a beam pair based at least in part on the fourth SSB being included in the one or more second SSBs.

34. The UE of claim 32, wherein the fourth SSB is included in the one or more second SSBs; and
wherein the one or more processors, when generating the same L1-RSRP measurement report, are configured to:
generate the same L1-RSRP measurement report to include the indication of a beam pair based at least in part on the fourth SSB being identified in a CSI-SSB-ResourceList field, included in the same L1-RSRP measurement report, that is different from a CSI-SSB-ResourceList field that identifies the third SSB.

35. The UE of claim 32, wherein an L1-RSRP measurement, associated with the second beam, is identified in the same L1-RSRP measurement report as a differential value relative to an L1-RSRP measurement associated with the first beam.

36. The UE of claim 35, wherein the differential value is quantized to a quantity of 4 bits.

37. The UE of claim 35, wherein the differential value is quantized to a quantity of 5 or more bits.

38. The UE of claim 32, wherein an L1-RSRP measurement associated with the first beam, and an L1-RSRP measurement associated with the second beam, are explicitly identified in the same L1-RSRP measurement report by respective 7-bit values.

39. The UE of claim 33, wherein the one or more processors, when generating the same L1-RSRP measurement report to include the indication of a beam pair, are configured to:

generate, based at least in part on a configuration, the same L1-RSRP measurement report to include:
a 7-bit value explicitly indicating an L1-RSRP measurement associated with the second beam,
a 4-bit value implicitly indicating the L1-RSRP measurement associated with the second beam as a differential value relative to an L1-RSRP measurement associated with the first beam, or
a 5 or more bit value implicitly indicating the L1-RSRP measurement associated with the second beam as the differential value relative to the L1-RSRP measurement associated with the first beam.

40. The UE of claim 33, wherein the one or more processors, when generating the same L1-RSRP measurement report to include the indication of a beam pair, are configured to:
generate, based at least in part on whether the first beam and the second beam are included in a same SSB set, the same L1-RSRP measurement report to include:
a 7-bit value explicitly indicating an L1-RSRP measurement associated with the second beam,
a 4-bit value implicitly indicating the L1-RSRP measurement associated with the second beam as a differential value relative to an L1-RSRP measurement associated with the first beam, or
a 5 or more bit value implicitly indicating the L1-RSRP measurement associated with the second beam as the differential value relative to the L1-RSRP measurement associated with the first beam.

41. A non-transitory computer-readable medium storing a set of instructions, the set of instructions comprising:
one or more instructions that, when executed by one or more processors of an apparatus, cause the apparatus to:
generate, for a same layer one reference signal received power (L1-RSRP) measurement report, indications to include an indication of:
L1-RSRP measurements associated with one or more first synchronization signal bocks (SSBs) included in a first SSB set that is associated with a first physical cell identifier (PCI), and
L1-RSRP measurements associated with one or more second SSBs included in a second SSB set that is associated with a second PCI; and
transmit the L1-RSRP measurements associated with the one or more first SSBs and the L1-RSRP measurements associated with one or more second SSBs in the same L1-RSRP measurement report.

42. The non-transitory computer-readable medium of claim 41, wherein the one or more first SSBs are identified in the same L1-RSRP measurement report by respective SSB indexes included in a first SSB index range associated with the first SSB set; and
wherein the one or more second SSBs are identified in the same L1-RSRP measurement report by respective relative SSB indexes included in a second SSB index range associated with the second SSB set,
wherein the first SSB index range and the second SSB index range are non-overlapping SSB index ranges.

43. The non-transitory computer-readable medium of claim 41, wherein each of the one or more first SSBs is identified in the same L1-RSRP measurement report by an indication of the first SSB set and an indication of an SSB index that indexes into the first SSB set; and
wherein each of the one or more second SSBs is identified in the same L1-RSRP measurement report by an indication of the second SSB set and an indication of an SSB index that indexes into the second SSB set.

44. An apparatus, comprising:
means for generating, for a same layer one reference signal received power (L1-RSRP) measurement report, indications of:
L1-RSRP measurements associated with one or more first synchronization signal bocks (SSBs) included in a first SSB set that is associated with a first physical cell identifier (PCI), and
L1-RSRP measurements associated with one or more second SSBs included in a second SSB set that is associated with a second PCI; and
means for transmitting the L1-RSRP measurements associated with one or more first SSBs and the L1-RSRP measurements associated with one or more second SSBS in the same L1-RSRP measurement report.

45. The apparatus of claim 44, wherein the one or more first SSBs are identified in the same L1-RSRP measurement report by respective SSB indexes included in a first SSB index range associated with the first SSB set; and
wherein the one or more second SSBs are identified in the same L1-RSRP measurement report by respective relative SSB indexes included in a second SSB index range associated with the second SSB set,
wherein the first SSB index range and the second SSB index range are non-overlapping SSB index ranges.

46. The apparatus of claim 44, wherein each of the one or more first SSBs is identified in the same L1-RSRP measurement report by an indication of the first SSB set and an indication of an SSB index that indexes into the first SSB set; and
wherein each of the one or more second SSBs is identified in the same L1-RSRP measurement report by an indication of the second SSB set and an indication of an SSB index that indexes into the second SSB set.

* * * * *